United States Patent
Chengalvala et al.

(10) Patent No.: US 11,593,447 B2
(45) Date of Patent: Feb. 28, 2023

(54) PRE-FETCH AND LAZY LOAD RESULTS OF IN-VEHICLE DIGITAL ASSISTANT VOICE SEARCHES

(71) Applicant: FORD GLOBAL TECHNOLOGIES, LLC, Dearborn, MI (US)

(72) Inventors: Venkata Maruthe Ravikumara Sharma Chengalvala, Troy, MI (US); James Heaton, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 733 days.

(21) Appl. No.: 16/258,260

(22) Filed: Jan. 25, 2019

(65) Prior Publication Data
US 2020/0242184 A1 Jul. 30, 2020

(51) Int. Cl.
| G06F 16/957 | (2019.01) |
| G06F 16/9032 | (2019.01) |
| B60K 35/00 | (2006.01) |
| B60R 11/04 | (2006.01) |
| G10L 15/22 | (2006.01) |
| G10L 17/00 | (2013.01) |

(52) U.S. Cl.
CPC .......... *G06F 16/9574* (2019.01); *B60K 35/00* (2013.01); *B60R 11/04* (2013.01); *G06F 16/90332* (2019.01); *G10L 15/22* (2013.01); *G10L 17/00* (2013.01); *B60K 2370/148* (2019.05); *G10L 2015/223* (2013.01)

(58) Field of Classification Search
None
See application file for complete search history.

(56) References Cited

U.S. PATENT DOCUMENTS

| 9,972,312 B2 | 5/2018 | Hilal et al. | |
| 2008/0215563 A1* | 9/2008 | Shi | G06F 16/951 |
| 2009/0265103 A1* | 10/2009 | Kostepen | G06F 16/9537 |
| | | | 701/469 |
| 2009/0271200 A1* | 10/2009 | Mishra | G01C 21/36 |
| | | | 704/254 |
| 2011/0047605 A1* | 2/2011 | Sontag | G06F 21/32 |
| | | | 726/7 |
| 2013/0086105 A1* | 4/2013 | Hammontree | G06F 3/167 |
| | | | 707/769 |

(Continued)

OTHER PUBLICATIONS

Ford Media Center, "Alexa in the Car: Ford, Amazon to Provide Access to Shop, Search and Control Smart Home Features on the Road," Jan, 4, 2017, retrieved from https://media.ford.com/content/fordmedia/fna/us/en/news/2017/01/04/alexa-car-ford-amazon-shop-search-home.html on Oct. 9, 2018.

(Continued)

*Primary Examiner* — Thu N Nguyen
(74) *Attorney, Agent, or Firm* — Joseph M. Zane; Brooks Kushman P.C.

(57) ABSTRACT

A system includes an audio input, a transceiver, and a processor. The processor is programmed to receive a voice query from a vehicle occupant per the audio input, evaluate the query locally to provide initial search results, in parallel, utilize the transceiver to concurrently evaluate the query using one or more remote digital assistants to receive historical and new search results, and merge the local results and the remote results to provide additional lazy load search results.

22 Claims, 4 Drawing Sheets

(56) References Cited

U.S. PATENT DOCUMENTS

2015/0127257 A1* 5/2015 Kurosawa ............. B60W 50/10
                                                    701/538
2016/0357853 A1* 12/2016 Moore ................ G06F 16/3344
2017/0147585 A1* 5/2017 Kleindienst ........... G06F 16/334
2017/0255627 A1* 9/2017 Coll ...................... G06F 16/248
2018/0096027 A1   4/2018 Romero et al.
2018/0114531 A1* 4/2018 Kumar ................... G10L 25/51

OTHER PUBLICATIONS

Nanwani, Rahul, "Lazy Loading Images—The Complete Guide," Aug. 23, 2018, retrieved from https://imagekit.io/blog/lazy-loading-images-complete-guide/ on Oct. 9, 2018.

* cited by examiner

PRE-FETCH AND LAZY LOAD RESULTS OF IN-VEHICLE DIGITAL ASSISTANT VOICE SEARCHES

TECHNICAL FIELD

Aspects of the disclosure generally relate to pre-fetch and lazy load of results of in-vehicle voice searches to one or more digital assistants.

BACKGROUND

Digital assistants generally relate to application programs that understand natural language voice commands and complete tasks for the user. Virtual assistants are typically cloud-based programs that require internet-connected devices and/or applications to work. As a result, such systems may have significant latency in their responses to queries. Nevertheless, the convenience of digital assistants continues to improve, and the adoption of such systems continues to increase.

SUMMARY

In one or more illustrative examples, a system includes an audio input, a transceiver, and a processor. The processor is programmed to receive a voice query from a vehicle occupant per the audio input, evaluate the query locally to provide initial search results, in parallel, utilize the transceiver to concurrently evaluate the query using one or more remote digital assistants to receive historical and new search results, and merge the local results and the remote results to provide additional lazy load search results.

In one or more illustrative examples, a method includes receiving a voice query from a vehicle occupant via an in-vehicle microphone, evaluating the query locally to provide initial search results, in parallel, utilizing a network connection to concurrently evaluate the query using one or more remote digital assistants to receive historical and new search results, and merging the local results and the remote results to perform a lazy load of additional search results after the providing of the initial search results.

In one or more illustrative examples, a non-transitory computer-readable medium comprising instructions that, when executed by one or more processors, cause the one or more processors to receive a voice query from a vehicle occupant via an in-vehicle microphone, evaluate the query locally to provide initial search results, in parallel, utilize a network connection to concurrently evaluate the query using one or more remote digital assistants to receive historical and new search results, and merge the local results and the remote results to perform a lazy load of additional search results after the providing of the initial search results.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Current automotive consumer trends show increased usage of in-vehicle voice-based search. This results in a desire to bring digital assistant technologies into the vehicle context, and to provide the voice search results with a minimum of latency. However, latency in communication between in-vehicle components of digital assistants and their respective off-board cloud components is a concern (e.g., for digitally-assisted navigation features, for in-vehicle voice-based purchases, etc.). Accordingly, improvements to latency may results in a better end-user experience.

This disclosure provides a standardized approach to pre-fetch and lazy load of voice search result content relevant to the user's search into the appropriate digital assistant in the vehicle (a user may utilize multiple digital assistants). This pro-active pre-fetching and lazy loading of the search results is based on analytics trained according to past voice searches and searches of relevance to the user. Search optimization and search results may be based on one or more of the following: (i) natural language support; (ii) subjectivity; (iii) synonymy; (iv) homonymy; (v) term frequency; (vi) relevance models; (vii) end-to-end system performance; (viii) result rankings; and (ix) dynamic merging of cloud-based results with local results at runtime.

In an example, a user (such as a driver or other vehicle occupant) makes a voice search request. An in-vehicle search component receives the voice-based search request, and performs the search using one or more digital assistants to receive the search results. An initial search may be performed locally while the digital assistant interacts with the speaker. In parallel with the initial local search, the digital assistant(s) may execute a parallel search with respective cloud components, and may fetch historic search results and search results by relevance. These received search results are then sent through an optimization algorithm to narrow down/pin point the data into a single result. This in-vehicle search component may utilize an optimization algorithm by connecting to an optimization cloud component for narrowing down the received results. In an example, criteria for narrowing down the search may include one or more of: (i) natural language support; (ii) subjectivity; (iii) synonymy; (iv) homonymy; (v) term frequency; (vi) relevance models; (vii) end-to-end system performance; (viii) result rankings; (ix) dynamic merging of cloud-based results with local results at runtime; (x) lazy-loading and dynamic merging at run-time based on initial customer responses; and (xi) an end-to-end framework that thereby reduces the latency of voice search results that are being presented. Further aspects of the disclosure are discussed in detail herein.

Figure 1:
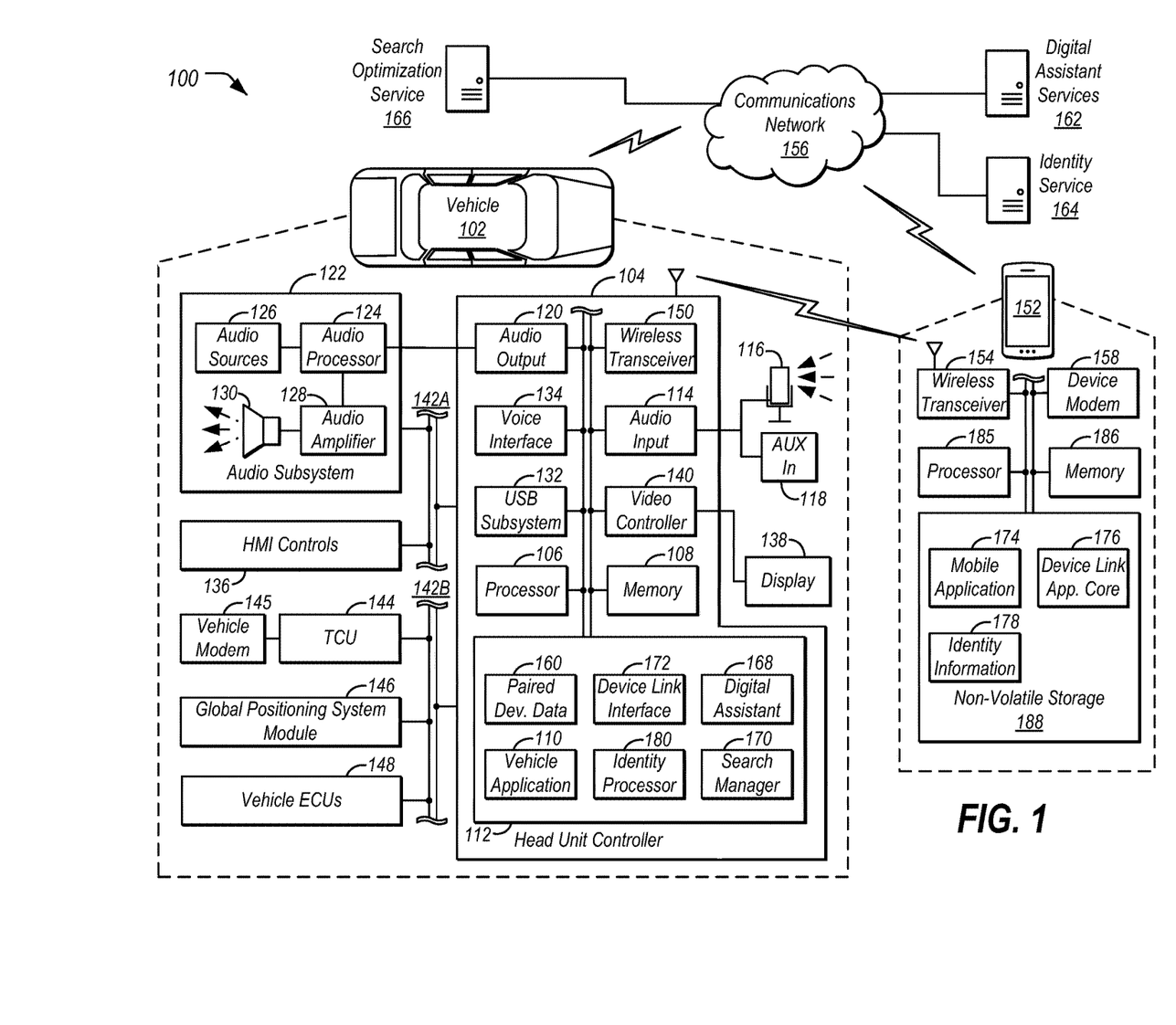
FIG. 1 illustrates an example diagram of a system configured to provide pre-fetch and lazy load of results of in-vehicle voice searches using one or more digital assistant services.

FIG. 1 illustrates an example diagram of a system 100 configured to provide pre-fetch and lazy load of results of in-vehicle voice searches using one or more digital assistant services. A vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

A head unit controller 104 may include one or more memories 108 and one or more processors 106 configured to perform instructions, commands, and other routines in support of the processes described herein. For instance, the head unit controller 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the head unit controller 104. Computer-executable instructions may be compiled or interpreted from computer programs created using a variety of programming languages and/or technologies, including, without limitation, and either alone or in combination, JAVA, C, C++, C#, OBJECTIVE C, FORTRAN, PASCAL, JAVA SCRIPT, PYTHON, PERL, and PL/SQL.

The head unit controller 104 may be provided with various features allowing the vehicle occupants to interface with the head unit controller 104. For example, the head unit controller 104 may include an audio input 114 configured to receive spoken commands from vehicle occupants through a connected microphone 116, and an auxiliary audio input 118 configured to receive audio signals from connected devices. The auxiliary audio input 118 may be a physical connection, such as an electrical wire or a fiber optic cable, or a wireless input, such as a BLUETOOTH audio connection or Wi-Fi connection. In some examples, the audio input 114 may be configured to provide audio processing capabilities, such as pre-amplification of low-level signals, and conversion of analog inputs into digital data for processing by the processor 106.

The head unit controller 104 may also provide one or more audio outputs 120 to an input of an audio subsystem 122 having audio playback functionality. In other examples, the head unit controller 104 may provide platform audio from the audio output 120 to an occupant through use of one or more dedicated speakers (not illustrated). The audio output 120 may include, as some examples, system generated chimes, pre-recorded chimes, navigation prompts, other system prompts, or warning signals.

The audio module 122 may include an audio processor 124 configured to perform various operations on audio content received from a selected audio source 126 and to platform audio received from the audio output 120 of the head unit controller 104. The audio processors 124 may be one or more computing devices capable of processing audio and/or video signals, such as a computer processor, microprocessor, a digital signal processor, or any other device, series of devices or other mechanisms capable of performing logical operations. The audio processor 124 may operate in association with a memory to execute instructions stored in the memory. The instructions may be in the form of software, firmware, computer code, or some combination thereof, and when executed by the audio processors 124 may provide audio recognition and audio generation functionality. The instructions may further provide for audio cleanup (e.g., noise reduction, filtering, etc.) prior to the processing of the received audio. The memory may be any form of one or more data storage devices, such as volatile memory, non-volatile memory, electronic memory, magnetic memory, optical memory, or any other form of data storage device.

The audio subsystem may further include an audio amplifier 128 configured to receive a processed signal from the audio processor 124. The audio amplifier 128 may be any circuit or standalone device that receives audio input signals of relatively small magnitude, and outputs similar audio signals of relatively larger magnitude. The audio amplifier 128 may be configured to provide for playback through vehicle speakers 130 or headphones (not illustrated).

The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the head unit controller 104, such as audio content generated by the head unit controller 104, audio content decoded from flash memory drives connected to a universal serial bus (USB) subsystem 132 of the head unit controller 104, and audio content passed through the head unit controller 104 from the auxiliary audio input 118. For instance, the audio sources 126 may also include Wi-Fi streamed audio, USB streamed audio, BLUETOOTH streamed audio, internet streamed audio, TV audio, as some other examples.

The head unit controller 104 may utilize a voice interface 134 to provide a hands-free interface to the head unit controller 104. The voice interface 134 may support speech recognition from audio received via the microphone 116 according to a standard grammar describing available command functions, and voice prompt generation for output via the audio module 122. The voice interface 134 may utilize probabilistic voice recognition techniques using the standard grammar in comparison to the input speech. In many cases, the voice interface 134 may include a standard user profile tuning for use by the voice recognition functions to allow the voice recognition to be tuned to provide good results on average, resulting in positive experiences for the maximum number of initial users. In some cases, the system may be configured to temporarily mute or otherwise override the audio source specified by an input selector when an audio prompt is ready for presentation by the head unit controller 104 and another audio source 126 is selected for playback.

The microphone 116 may also be used by the head unit controller 104 to detect the presence of in-cabin conversations between vehicle occupants. In an example, the head unit controller 104 may perform speech activity detection by filtering audio samples received from the microphone 116 to a frequency range in which first formants of speech are typically located (e.g., between 240 and 2400 HZ), and then applying the results to a classification algorithm configured to classify the samples as either speech or non-speech. The classification algorithm may utilize various types of artificial intelligence algorithm, such as pattern matching classifiers, K nearest neighbor classifiers, as some examples.

The head unit controller 104 may also receive input from human-machine interface (HMI) controls 136 configured to provide for occupant interaction with the vehicle 102. For instance, the head unit controller 104 may interface with one or more buttons or other HMI controls configured to invoke functions on the head unit controller 104 (e.g., steering wheel audio buttons, a push-to-talk button, instrument panel controls, etc.). The head unit controller 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The head unit controller 104 may be further configured to communicate with other components of the vehicle 102 via one or more in-vehicle networks 142. The in-vehicle networks 142 may include one or more of a vehicle controller area network (CAN), an Ethernet network, and a media-oriented system transfer (MOST), as some examples. The in-vehicle networks 142 may allow the head unit controller 104 to communicate with other vehicle 102 systems, such as a telematics control unit 144 having an embedded modem 145, a global positioning system (GPS) module 146 configured to provide current vehicle 102 location and heading information, and various vehicle electronic control units (ECUs) 148 configured to cooperate with the head unit controller 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors, and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the head unit controller 104 over a first in-vehicle network 142-A, and the telematics control unit 144, GPS module 146, and vehicle ECUs 148 may communicate with the head unit controller 104 over a second in-vehicle network 142-B. In other examples, the head unit controller 104 may be connected to more or fewer in-vehicle networks 142. Additionally or alternately, one or more HMI controls 136 or other components may be connected to the head unit controller 104 via different in-vehicle networks 142 than shown, or directly without connection to an in-vehicle network 142.

The head unit controller 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the head unit controller 104. In many examples, the head unit controller 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the head unit controller 104 may communicate with the mobile device 152 over a wired connection, such as via a USB connection between the mobile device 152 and the USB subsystem 132. In some examples, the mobile device 152 may be battery powered, while in other cases the mobile device 152 may receive at least a portion of its power from the vehicle 102 via the wired connection.

A communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the head unit controller 104 may be identified by the head unit controller 104 according to paired device data 160 maintained in the storage medium 112. The paired device data 160 may indicate, for example, the unique device identifiers of mobile devices 152 previously paired with the head unit controller 104 of the vehicle 102, such that the head unit controller 104 may automatically reconnected to the mobile devices 152 referenced in the paired device data 160 without user intervention.

When a mobile device 152 that supports network connectivity is paired with and connected to the head unit controller 104, the mobile device 152 may allow the head unit controller 104 to use the network connectivity of the device modem 158 to communicate over the communications network 156 with various remote computing devices. In one example, the head unit controller 104 may utilize a data-over-voice plan or data plan of the mobile device 152 to communicate information between the head unit controller 104 and the communications network 156. Additionally or alternately, the head unit controller 104 may utilize the telematics control unit 144 to communicate information between the head unit controller 104 and the communications network 156, without use of the communications facilities of the mobile device 152.

Similar to the head unit controller 104, the mobile device 152 may include one or more processors 185 configured to execute instructions of mobile applications 174 loaded to a memory 186 of the mobile device 152 from a storage medium 188 of the mobile device 152. In some examples, the mobile applications 174 may be configured to communicate with the head unit controller 104 via the wireless transceiver 154 and with various network services via the device modem 158.

Each of the digital assistant services 162, the identity service 164, and the search optimization service 166 may include various types of computing apparatus, such as a computer workstation, a server, a desktop computer, a virtual server instance executed by a mainframe server, or some other computing system and/or device such as cloud servers, virtual servers, and/or services or software. Similar to the head unit controller 104, the one or more devices of each of the digital assistant service 162, the identity service 164, and the search optimization service 166 may include a memory on which computer-executable instructions may be maintained, where the instructions may be executable by one or more processors of the devices. It should also be noted that while the identity service 164 is shown as being cloud-based, in other examples the identity service 164 may be located on the vehicle 102. In yet further examples, identity services 164 may be located on the vehicle 102 and in the cloud, and the vehicle 102 may have the ability to use either or both to perform identity determinations.

A digital assistant may refer to a software agent designed to perform tasks or services for an individual. In some examples, digital assistants may receive voice input from a user, convert the voice input into requests for actions, execute the actions, and provide results of the actions back to the user. Possible actions to be performed by the digital assistants may include, based on a voice request, providing search results, ordering goods or services, selecting media for playback, adjusting home automation settings, and so on.

The digital assistant services 162 include various cloud-based virtual assistants, which are software agents designed to perform tasks or services for an individual. As some examples, the digital assistant services 162 may include the Siri digital assistant provided by Apple, Inc. of Cupertino, Calif., the Cortana digital assistant provided by Microsoft Corp. of Redmond, Wash., and the Alexa digital assistant provided by Amazon.com Inc. of Seattle, Wash.

The digital assistant agents 168 may include client-side on-vehicle software, installed to the storage 112 of the head until controller 104, and configured to provide digital assistant functionality to occupants of the vehicle 102. In some examples, the digital assistant agents 168 may be stand-alone, while in other cases the digital assistant agents 168 may be networked components installed to the head unto controller 104 that are configured to communicate over the communications network 156 with cloud-based digital assistant services 162.

The search manager 170 may include client-side on-vehicle software, installed to the storage 112 of the head until controller 104, and configured to provide search query management functionality to occupants of the vehicle 102. For example, the search manager 170 may receive queries from the vehicle occupants, e.g., through the microphone 116 and, in some cases, using the services of the voice interface 134 to convert spoken words into text. The search manager 170 may further perform local search functionality responsive to receipt of the search to provide initial search results, utilize the digital assistants 168 to utilize digital assistant functionality to provide additional results to the query, process and optimize the search results including the lazy loading of the additional results from the digital assistants 168, and present the results to the occupant. The search manager 170 may also be configured to utilize the capability in lazy load to start presenting results while the parallel results have not arrived or are inbound, or are not yet sorted.

The search optimization service 166 may include functionality to sort, select from, alter, or otherwise improve upon raw search results to improve the relevance of the results to a user. In an example, search optimization service 166 may be trained according to past searches and/or other searches of relevance to the user. The search optimization service 166 may perform search optimization on search results based on one or more of the following: (a) natural language support; (b) subjectivity; (c) synonymy; (d) homonymy; (e) term frequency; (f) relevance models; (g) end-to-end system performance; (h) result rankings; and (i) dynamic merging of cloud-based results with local results at runtime. In some examples, the search manager 170 may make use of the services of the search optimization service 166 to optimize the search results for presentation to the occupants.

The head unit controller 104 may also include a device link interface 172 to facilitate the integration of functionality of the mobile applications 174 configured to communicate with a device link application core 176 executed by the mobile device 152. In some examples, the mobile applications 174 that support communication with the device link interface 172 may statically link to or otherwise incorporate the functionality of the device link application core 176 into the binary of the mobile applications 174. In other examples, the mobile applications 174 that support communication with the device link interface 172 may access an application programming interface (API) of a shared or separate device link application core 176 to facilitate communication with the device link interface 172.

The integration of functionality provided by the device link interface 172 may include, as an example, the ability of mobile applications 174 executed by the mobile device 152 to incorporate additional voice commands into the grammar of commands available via the voice interface 134. For instance, by using the device link interface 172, additional digital assistants available to the mobile device 152 may be made available to be used by the head unit controller 104.

The device link interface 172 may also provide the mobile applications 174 with access to vehicle information available to the head unit controller 104 via the in-vehicle networks 142. The device link interface 172 may further provide the mobile applications 174 with access to the vehicle display 138. An example of a device link interface 172 may be the SYNC APPLINK component of the SYNC system provided by The Ford Motor Company of Dearborn, Mich. Other examples of device link interfaces 172 may include MIRRORLINK, APPLE CARPLAY, and ANDROID AUTO.

The mobile device 152 may be configured to provide identity information 178 from the mobile device 152 to the head unit controller 104. In an example the identity information 178 may include keys or other information specific to a user that is stored to the storage 188 of the mobile device 152. In another example, the identity information 178 may include passcode, biometrics, or other information received from a user of the mobile device 152.

The identity processor 180 may include on-vehicle software configured to manage determination of identities of vehicle occupants providing search queries to the search manager 170. The identity processor 180 may use data, such as the identity information 178, to determine an identity of a vehicle occupant initiating a search query.

The identity service 164 may include various networked services for the management of electronic or digital identities. For example, the identity service 164 may capture and record user login information, manage a database of user identities, and manage assignment and removal of access privileges of the users to managed resources. The identity service 164 may accordingly be used to perform operations such as authentication and validation of the identity of a user, and confirmation that a user has access to a given service. The identity processor 180 may communicate with the identity service 164 to confirm the identity of a vehicle occupant making a query, and also to aid in personalization of the search results optimizations performed by the search manager 170 responsive to processing of a search query.

Figure 2:
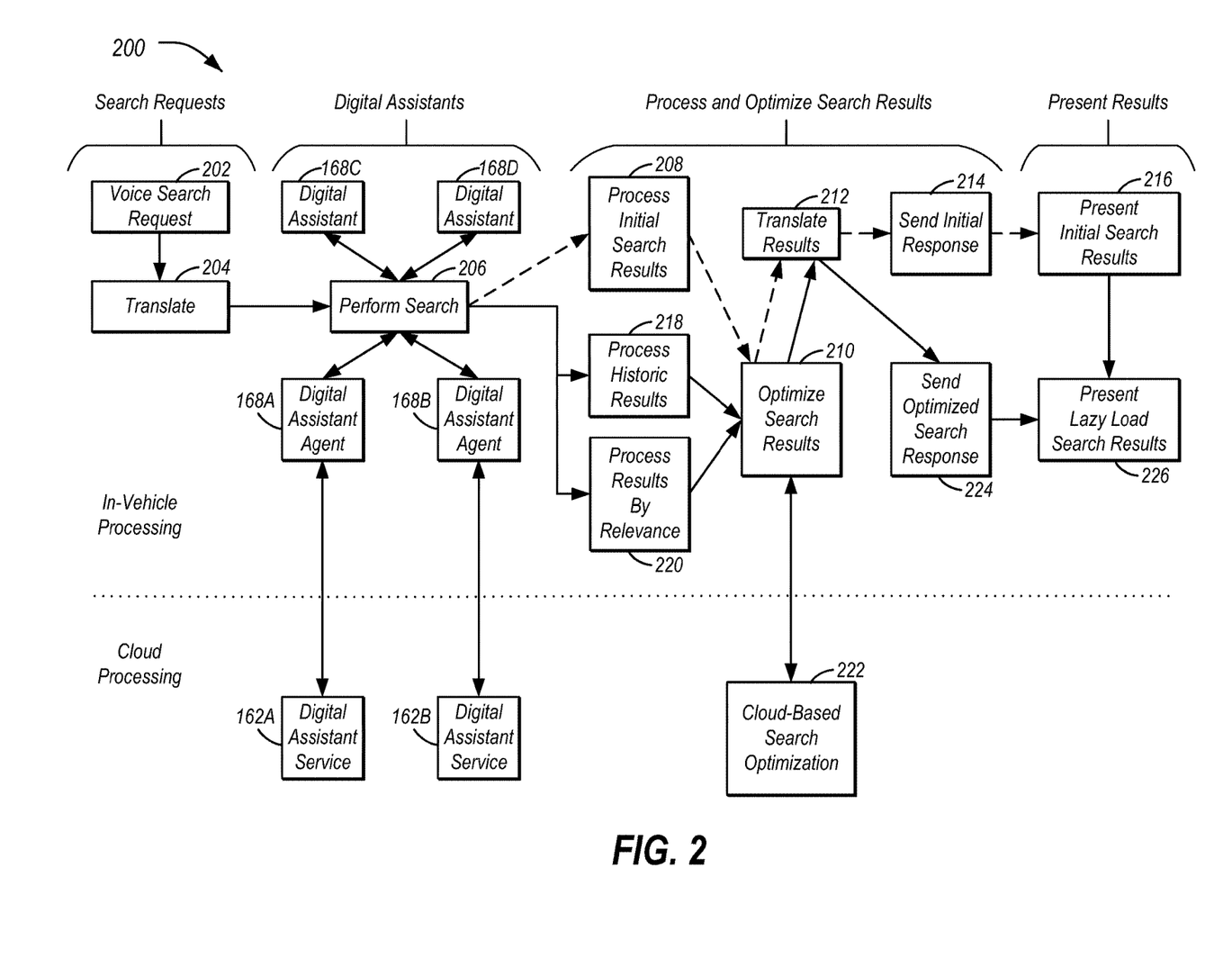
FIG. 2 illustrates an example data flow diagram for the processing of pre-fetch and lazy load of results of in-vehicle voice searches using one or more digital assistant services.

FIG. 2 illustrates an example data flow diagram 200 for the processing of pre-fetch and lazy load of results of in-vehicle voice searches using one or more digital assistant services. In an example, the data flow diagram 200 may be performed using the system 100 discussed in detail above.

As shown, at 202 a voice search request is received to the vehicle 102. In an example, a vehicle occupant may request for certain information to be displayed, such as the best local restaurant for sushi, or for parking availability in a local parking garage. At 204, the received audio is translated into a form suitable for search. In some cases, this translation may include the voice interface 134 utilizing probabilistic voice recognition techniques using in comparison to the input speech to determine a textual representation of the input.

At 206, the vehicle 102 performs the search 206. Notable, this search may include utilizing multiple digital assistants, both local to the vehicle 102 and also remote from the vehicle 102. In general, an initial search may be performed locally while the networked digital assistants interacts with the occupant who is speaking. In parallel with an initial local search, the networked digital assistants execute a parallel search with respective cloud components, and fetch historic search results and search results by relevance. In the illustrated example, the search includes sending the input query to four digital assistant agents 168, two of which are networked agents communicating with remote digital assistant services 162, and two of which are local digital assistant agents 168 that operate using the computing resources of the vehicle 102. More specifically, the digital assistant agent 168A communicates over the communications network 156 with the digital assistant service 162A and the digital assistant agent 168B communicates over the communications network 156 with the digital assistant service 162B. The digital assistant agents 168C and 168D processes the input query locally. It should be noted that this is merely an example, and in other instances more or fewer digital assistant agents 168 may be used. For example, there may be more or fewer digital assistant agents 168 local to the vehicle, and there may be more or fewer digital assistant agents 168 communicating with remote services.

Notably, the networked digital assistants may be able to provide better or more detailed results due to the increased processing, memory, and accessible data resources available to the digital assistant services 162 as compared to the resources available locally at the vehicle 102. However, the latency between requesting the results and receiving the results may be greater for the networked digital assistants as compared to the digital assistants that execute local to the vehicle 102. As shown in the diagram 200, the dashed lines in the remainder of the diagram signify the path for results received from the local digital assistants, while the solid lines in the remainder of the diagram signify the path for results received from the networked digital assistants.

First, the results from the local digital assistants 168C and 168D are received, responsive to the search at 206. These initial results are processed at 208. For example, at 208 the initial results from multiple local digital assistants 168 may be de-duplicated or otherwise combined into a single uniform listing of results. At 210, these results may be optimized. For example, ordering and visibility of the results may be improved based on historical knowledge, relevance determinations, or other factors that may be used to adjust the ordering or whether items are even included in the results. Search optimization may be based on one or more of the following: (i) natural language support; (ii) subjectivity; (iii) synonymy; (iv) homonymy; (v) term frequency; (vi) relevance models; (vii) end-to-end system performance; and/or (viii) result rankings. These results are then translated at 212 into a format suitable for being provided to occupants of the vehicle 102. For instance, a best result may be translated into text for display or input to a text-to-speech algorithm, or a set of results may be formatted into a list format for selection by an operator.

At 214, the translated results are sent to the HMI of the vehicle 102. For instance, the results may be provided to the display 138. In another example, the results may be provided to the audio subsystem 122 after processing from text to speed via the voice interface 134. These initial results may be presented to the occupant at 216.

Returning to the flow of the networked digital assistants, networked results may be received at 206. These results may include historic search results indicative of results that were provided for the same or similar queries (in some cases, these results were provided to the same occupant, as determining used identity services discussed in more detail below), as well as search results sorted by relevance. At 218 the historic results are processed, and at 220 the relevance results are processed. This processing at 218 and 220 may include, for example de-duplication or other combination of results into a single uniform listing.

Again, the search results are optimized at 210, however this second time including the results from the networked digital assistants. Moreover, the optimization at 210 (e.g., a re-optimization) may further include performance of cloud-based search optimization at 222. This re-optimization may include results currently being presented to the user for a seamless user experience. For instance, if the procedure is halfway through presenting choice two of the local agent list, the re-optimization may enhance the remainder of choice two that has not been presented (for instance to change to a better wording), and may totally replace choices from three on, with no realization from the user that subsequent choices have changed on the fly. As additional results are received at 206, this operation may happen multiple times in a single list being presented. In an example, criteria for narrowing down the search may include one or more of: (i) natural language support; (ii) subjectivity; (iii) synonymy; (iv) homonymy; (v) term frequency; (vi) relevance models; (vii) end-to-end system performance; (viii) result rankings; (ix) dynamic merging of cloud-based results with local results at runtime; (x) lazy-loading and dynamic merging at run-time based on initial customer responses; and (xi) an end-to-end framework that thereby reduces the latency of voice search results that are being presented. In an example, the optimization algorithm may narrow down or otherwise pin point the data into a single result or set of results. These optimized results are again translated at 212, and then sent as an optimized search results at 224 to the vehicle HMI for presentation as lazy-load search results at 226. Accordingly, the latency involved in using the remote digital assistant services 162 is masked by the initial results provided more quickly by the local search, thereby improving the latency of voice search results that are being presented.

Figure 3:
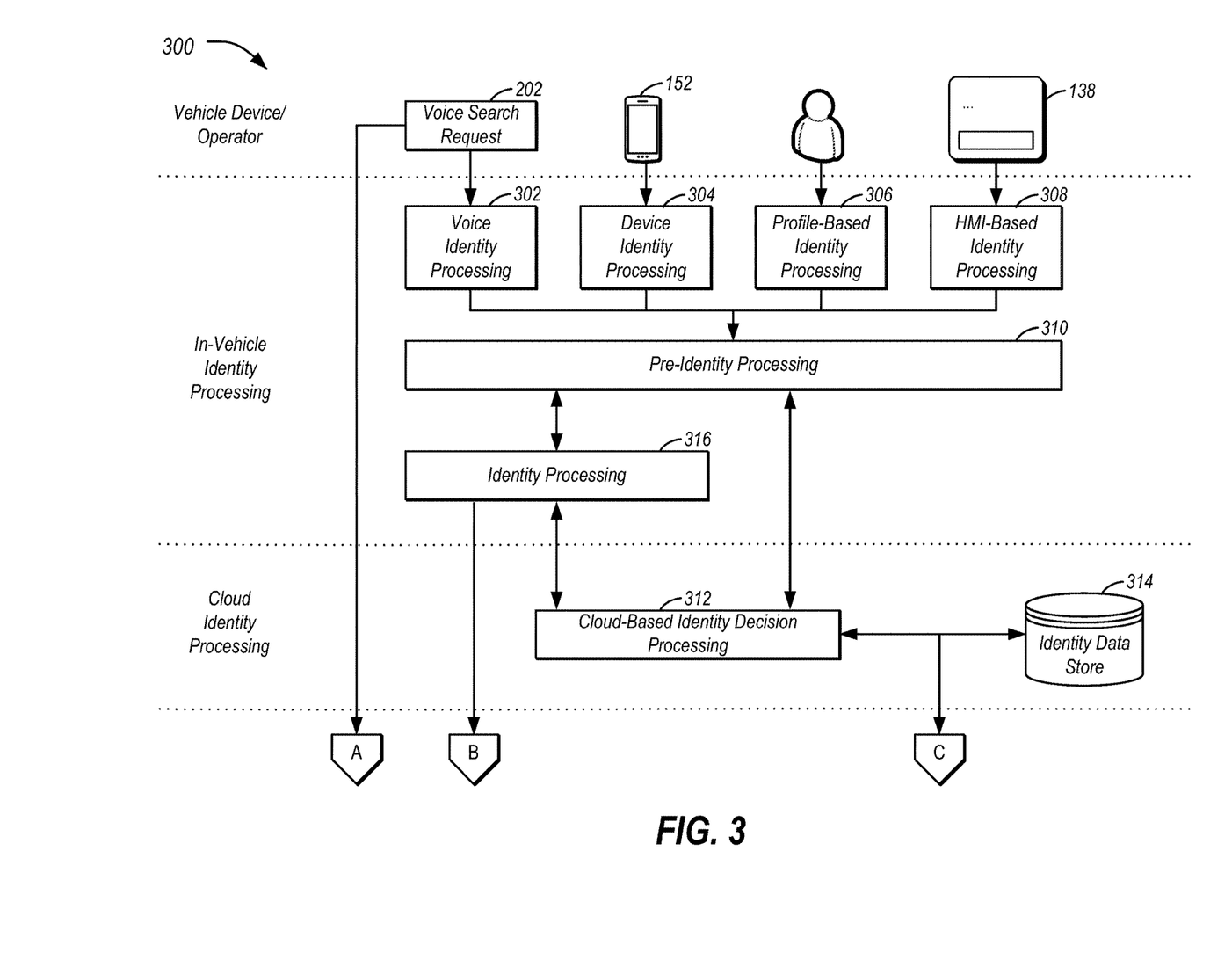
FIG. 3 illustrates an example data flow diagram for identity processing for use in pre-fetch and lazy load of results of in-vehicle voice searches.

FIG. 3 illustrates an example data flow diagram 300 for identity processing for use in pre-fetch and lazy load of results of in-vehicle voice searches. The diagram 300 accordingly shows additional details of the processing described above in terms of the identity aspects of the providing of search results. In an example, the in-vehicle identity processing described with respect to the diagram 300 may be performed by computing elements of the head unit controller 104, while the cloud identity processing may be performed by computing elements of the identity service 164 or other cloud-based computing components.

As discussed above, a voice search request 202 may be received. In addition to processing the words of the voice search request 202, the voice search request 202 may also be used for identification of the speaker. At 302, the vehicle 102 may perform voice identity processing to identity the speaker. For instance, the user may be identified using previously-stored vocal fingerprint data. Other channels for determining identity may be used as well. For instance, the user may be identified using a camera via visual biometrics, and/or via a fingerprint scanner or other biometric sensor. At 304, the vehicle 102 may perform device identity processing, such as via detection of a key fob assigned to a user or via identity information 178 received from a user's mobile device 152. At 306, the vehicle 102 may perform profile-based identity processing, e.g., based on biometrics of the user, seat sensor information, entertainment settings that are used, a driving profile of the user, a navigation profile including destinations frequented by or specific to the user, and so on. At 308, the vehicle 102 may perform HMI-based identity processing, including, for example, receipt of a passcode or other identifying information via the HMI of the vehicle 102.

In order to accurately identify a person, multifactor identification with one or more of these channels may be used. Each of these channels may send the results for pre-identity processing at 310. The pre-identity processing may utilize an algorithm to identify a person using one or more identity channels depending on the feature requirements. For instance, one feature may use only one identity channel to identify a user whereas other features may leverage for two or more channels to more accurately identify a user. In some cases, the pre-identity processing may interact with the identity service 164, shown at 312, to identify the vehicle occupant. For instance, the identity service 164 may utilize an identity data store 314 to match the identity characteristics identified by the channels to one or more user identities stored to the data store 314. Depending on the channels used, it is possible for the pre-identity processing to return more than one possible user.

If the pre-identity processing 310 results in more than one possible identity, then the pre-identity processing 310 may pass on the identified user information to the identity processing 316. The identity processing 316 may employ additional algorithms to more accurately narrow down the list to one unique identity. If the identity processing 316 is unable to narrow down to a single identity, then the identity processing 316 may attempt to identify the user with a pseudo name (e.g., a role such as driver, passenger, employee, etc.). If the identity processing 316 is unable to identity even a pseudo name, the user may be identified as anonymous, and information regarding the failure may be logged into the identity store. As with the pre-identity processing, the identity processing may also interact with the cloud-based identity decision processing 312 of the identity service 164 for identifying the users.

Figure 4:
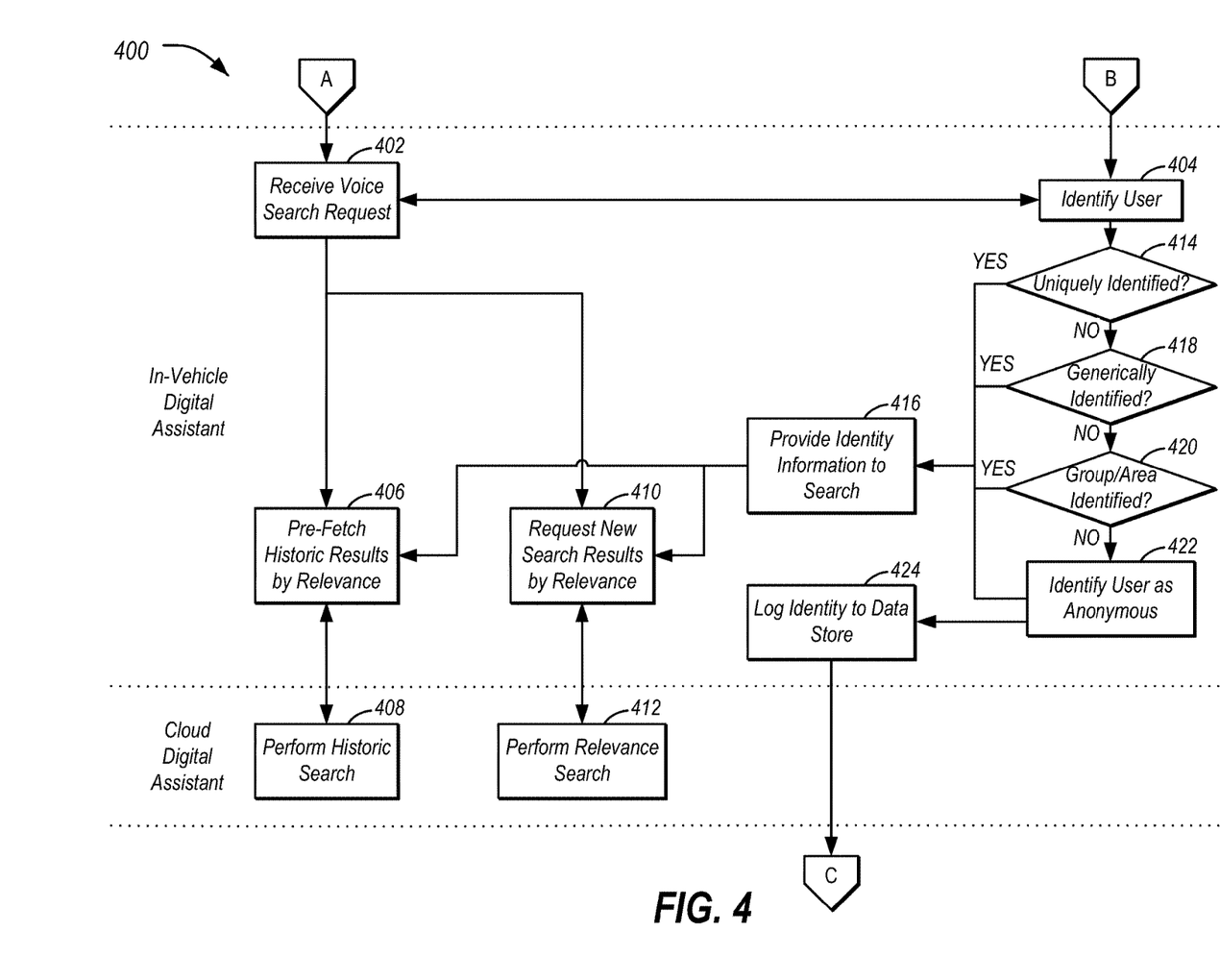
FIG. 4 illustrates an example data flow diagram for utilizing the identity processing shown in FIG. 3 for use in pre-fetch and lazy load of results of in-vehicle voice searches.

FIG. 4 illustrates an example data flow diagram 400 for utilizing the identity processing shown in FIG. 3 for use in pre-fetch and lazy load of results of in-vehicle voice searches. The diagram 400 accordingly shows additional details of the processing described above in terms of using the identity aspects for providing of search results. In an example, the in-vehicle digital assistant processing described with respect to the diagram 400 may be performed by computing elements of the head unit controller 104, while the cloud digital assistant processing may be performed by computing elements of the digital assistant services 162 or other cloud-based computing components.

At 402, the voice search request 202 is received. Notably, as referenced at (A) in the diagrams 300 and 400, this may be the same voice search request 202 received at processed for identity purposes in the diagram 300. At 404, the user is identified. Moreover, as referenced at (B) in the diagrams 300 and 400, this identity may be the identity determined as discussed in detail with regard to the diagram 300.

At 406, the vehicle 102 performs a pre-fetch of historic results by relevance. In an example, and as discussed above, this may include utilizing one or more digital assistant agents 168 to communicate over the communications network 156 with one or more respective digital assistant services 162 at 408 to retrieve the historic results. Similarly, at 410, the vehicle 102 performs a request for new search results by relevance. In an example, and as discussed above, this may include utilizing one or more digital assistant agents 168 to communicate over the communications network 156 with one or more respective digital assistant services 162 at 412 to retrieve the relevance search results.

Moreover, these historic requests and new search requests may be informed by the identity determination references at 404. For instance, with reference to the identity received at 404, at 414 the vehicle 102 may determine whether a specific identity of a user was identified. If so, control passes to 416 to provide that identity information to the per-fetch of historic results by relevance 406 and also to the request for new search results by relevance 410. This allows those searches to provide historical data and new results in the context of the user. For instance, the historical data could include results previously presented to the user, or previously selected by the user. As another possibility, the new results could be ordered or selected based on preferences of the user that may be available according to a search profile for the user keyed to the identity of the user.

Referring back to 414, if no specific user identity was indicated, control passes to operation 418 to determine whether a generic identity was provided. The generic identity may indicate a pseudo name, such as a role of the speaker, in an example, such as that the speaker is a driver, a passenger, an employee, etc. If such a pseudo identity is available, control passes to operation 416 to provide that information for the searches. This may allow the searches to provide results tailored to someone in that same role, even if the results cannot be tailored to the specific user.

If no generic identity is available at 418, then control passes to 422 to determine whether a group identity or location may be provided or identified. For instance, a group of users in which the user is a member or cohorts of the user may be used, or location-based tailoring may be used to show results near the user even if a specific or generic identity of the user is not known. If no group or location is identified at 422 then control passes to 424 to identify the user as anonymous. This information too may be provided to the searches at 416, to allow the searches to be performed anonymously, without tailoring to the specific user or user role. Additionally, the user of an anonymous identity for the search may be logged at 424. For instance, as shown by reference (C) in the diagrams 300 and 400, this indication of an anonymous identity may be recorded as a log entry in the identity data store at 314. This information may allow for the system to revisit those identities that were inconclusive, for example to aid in improving the user identification algorithms in the future.

Thus, the system 100 may provide a standardized approach to pre-fetch and lazy load of search result content relevant to the user's search. Such techniques may be used for voice searches as discussed above. Moreover, such techniques may also be applicable to other search contexts, such as search based on a HMI click, text typed in, or other non-voice input approaches. In these other approaches, the results may in some cases still be spoken back even if the search was not initiated by voice. This pro-active pre-fetching and lazy loading of the search results, including local searching augmented by networked search results, may allow for a reduction in latency in providing results of a search to a user, thereby improving the overall search user experience.

Computing devices described herein, such as the head unit controller 104 and mobile device 152, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, JAVA™, C, C++, C#, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   an audio input;
   a transceiver; and
   a processor programmed to
      receive a voice query from a vehicle occupant per the audio input,
      evaluate the query locally to provide initial local search results,
      present the initial search results,
      in parallel with the presentation of the initial search results, utilize the transceiver to concurrently evaluate the query using one or more remote digital assistants to receive historical and new search results, and
      merge the local results and the remote results into the presentation of the initial search results to provide additional lazy load search results.

2. The system of claim 1, wherein the processor is further programmed to:
   determine an identity of the vehicle occupant using one or more channels of user identity information; and
   provide the identity of the vehicle occupant to the one or more remote digital assistants to receive historical and new search results tailored to the identity of the vehicle occupant.

3. The system of claim 2, wherein the one or more channels of user identity information include one or more of: a voice identity channel configured to determine user identity via voice print, a device identity channel configured to determine user identity via identity information received from a user device, a profile-based identity channel configured to determine user identity via profile information representative of characteristics of users of the system, and a human-machine input identity channel configured to determine user identity via receipt of HMI input from users.

4. The system of claim 2, wherein the processor is further programmed to:
   responsive to the identity of the vehicle occupant being inconclusively determined, determine a generic identity of the vehicle occupant as a pseudo name indicative of a role of the occupant; and
   provide the identity of the vehicle occupant to the one or more remote digital assistants to receive historical and new search results tailored to the role of the vehicle occupant.

5. The system of claim 4, wherein the processor is further programmed to, responsive to the role of the vehicle occupant being inconclusively determined, indicate to the one or more remote digital assistants that the vehicle occupant is anonymous to receive historical and new search results for an anonymous user without identity information.

6. The system of claim 1, wherein the processor is further programmed to optimize the historical and new search results by utilizing a cloud-based search optimization.

7. The system of claim 6, wherein the cloud-based search optimization includes one or more of (i) natural language support; (ii) subjectivity; (iii) synonymy; (iv) homonymy; (v) term frequency; and (vi) relevance models.

8. A method comprising:
receiving a voice query from a vehicle occupant via an in-vehicle microphone;
evaluating the query locally to provide initial search results;
presenting the initial search results;
in parallel with the presenting of initial search results, utilizing a network connection to concurrently evaluate the query using one or more remote digital assistants to receive historical and new search results; and
merging the initial results and the remote results into the presenting of the initial search results to perform a lazy load of additional search results after the providing of the initial search results.

9. The method of claim 8, further comprising:
determining an identity of the vehicle occupant using one or more channels of user identity information; and
providing the identity of the vehicle occupant to the one or more remote digital assistants to receive historical and new search results tailored to the identity of the vehicle occupant.

10. The method of claim 9, wherein the one or more channels of user identity information include one or more of: a voice identity channel configured to determine user identity via voice print, a device identity channel configured to determine user identity via identity information received from a user device, a profile-based identity channel configured to determine user identity via profile information representative of characteristics of system users, and a human-machine input identity channel configured to determine user identity via receipt of HMI input from users.

11. The method of claim 9, further comprising:
responsive to the identity of the vehicle occupant being inconclusively determined, determining a generic identity of the vehicle occupant as a pseudo name indicative of a role of the occupant; and
providing the identity of the vehicle occupant to the one or more remote digital assistants to receive historical and new search results tailored to the role of the vehicle occupant.

12. The method of claim 11, further comprising, responsive to the role of the vehicle occupant being inconclusively determined, indicating to the one or more remote digital assistants that the vehicle occupant is anonymous to receive historical and new search results for an anonymous user without identity information.

13. The method of claim 8, further comprising optimizing the historical and new search results by utilizing a cloud-based search optimization.

14. The method of claim 13, wherein the cloud-based search optimization includes one or more of (i) natural language support; (ii) subjectivity; (iii) synonymy; (iv) homonymy; (v) term frequency; and (vi) relevance models.

15. A non-transitory computer-readable medium comprising instructions that, when executed by one or more processors, cause the one or more processors to:
receive a voice query from a vehicle occupant via an in-vehicle microphone,
evaluate the query locally to provide initial local search results,
present the initial search results,
in parallel with the presentation of the initial search results, utilize a network connection to concurrently evaluate the query using one or more remote digital assistants to receive historical and new search results, and
merge the local search results and the results from the remote digital assistants into the presentation of the initial search results to perform a lazy load of additional search results after the providing of the initial search results.

16. The medium of claim 15, further comprising instructions that, when executed by the one or more processors, cause the one or more processors to:
determine an identity of the vehicle occupant using one or more channels of user identity information; and
provide the identity of the vehicle occupant to the one or more remote digital assistants to receive historical and new search results tailored to the identity of the vehicle occupant.

17. The medium of claim 16, wherein the one or more channels of user identity information include one or more of: a voice identity channel configured to determine user identity via voice print, a device identity channel configured to determine user identity via identity information received from a user device, a profile-based identity channel configured to determine user identity via profile information representative of characteristics of system users, and a human-machine input identity channel configured to determine user identity via receipt of HMI input from users.

18. The medium of claim 16, further comprising instructions that, when executed by the one or more processors, cause the one or more processors to:
responsive to the identity of the vehicle occupant being inconclusively determined, determine a generic identity of the vehicle occupant as a pseudo name indicative of a role of the occupant; and
provide the identity of the vehicle occupant to the one or more remote digital assistants to receive historical and new search results tailored to the role of the vehicle occupant.

19. The medium of claim 18, further comprising instructions that, when executed by the one or more processors, cause the one or more processors to, responsive to the role of the vehicle occupant being inconclusively determined, indicate to the one or more remote digital assistants that the vehicle occupant is anonymous to receive historical and new search results for an anonymous user without identity information.

20. The medium of claim 15, further comprising instructions that, when executed by the one or more processors, cause the one or more processors to optimize the historical and new search results by utilizing a cloud-based search optimization including one or more of (i) natural language support; (ii) subjectivity; (iii) synonymy; (iv) homonymy; (v) term frequency; and (vi) relevance models.

21. The system of claim 6, wherein the processor is further programmed to, after beginning the presentation of the initial search results, perform the cloud-based search optimization, the cloud-based search optimization including to enhance a remainder of a search result being presented, the enhance including to change a wording of the search result.

22. The system of claim 6, wherein the processor is further programmed to, after beginning the presentation of the initial search results, perform the cloud-based search optimization, the cloud-based search optimization including to replace a search result not yet presented.

\* \* \* \* \*